Oct. 26, 1965 W. A. FISH, JR., ETAL 3,214,554

ARC-EXTINGUISHING GRID STRUCTURE FOR FLUID-BLAST CIRCUIT INTERRUPTERS

Filed July 6, 1960 9 Sheets-Sheet 1

WITNESSES
Wm. L. Groome
James F. Young

INVENTORS
William A. Fish, Jr.
& Joseph Sucha
BY
Willard R. Crout
ATTORNEY

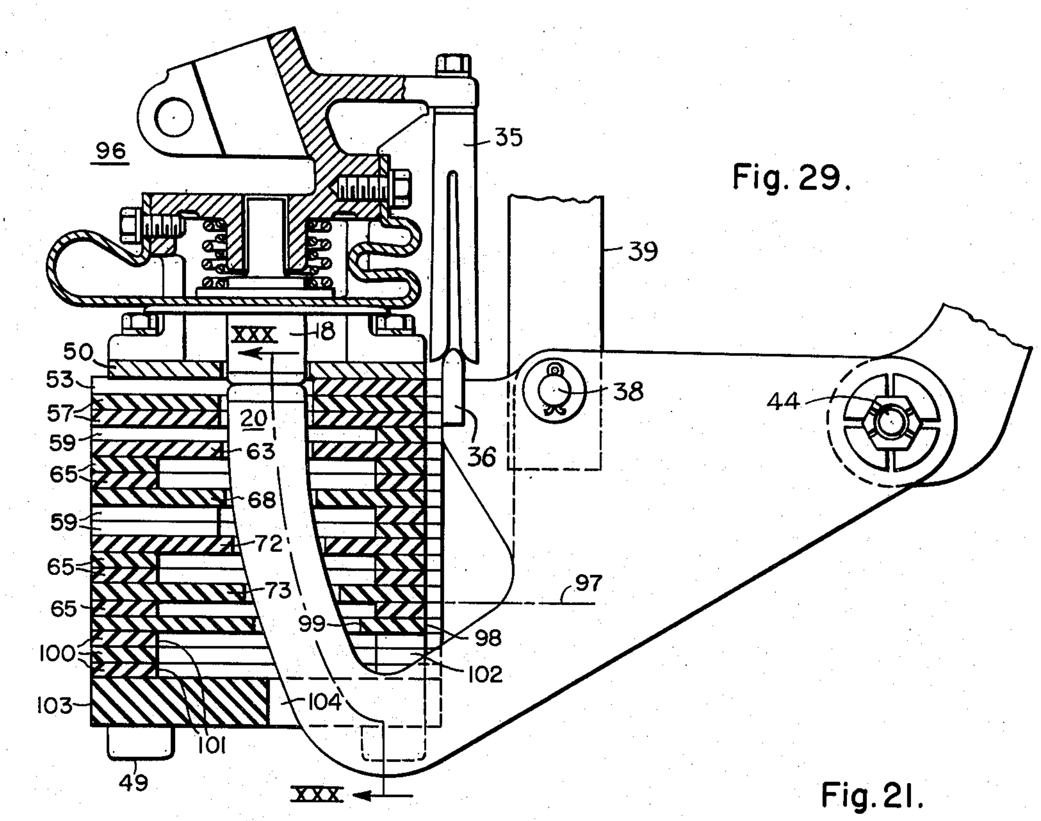
Fig. 29.
Fig. 21.
Fig. 19.
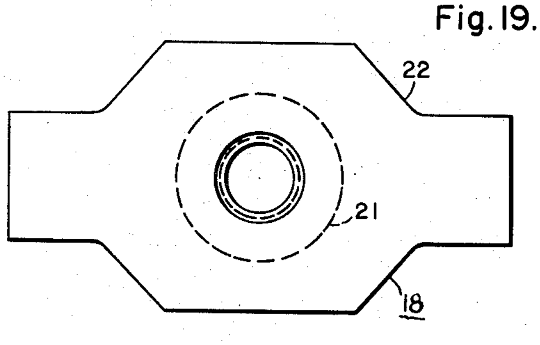
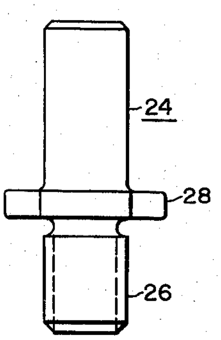
Fig. 20.
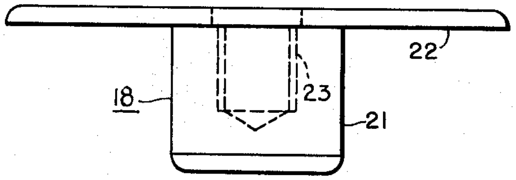
Fig. 22.
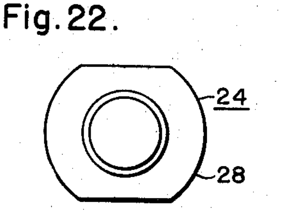

United States Patent Office 3,214,554
Patented Oct. 26, 1965

3,214,554
ARC-EXTINGUISHING GRID STRUCTURE FOR FLUID-BLAST CIRCUIT INTERRUPTERS

William A. Fish, Jr., Wilkins Township, Allegheny County, and Joseph Sucha, Port Vue, Pa., assignors to Westinghouse Electric Corporation, East Pittsburgh, Pa., a corporation of Pennsylvania Filed July 6, 1960, Ser. No. 41,194
8 Claims. (Cl. 200—150)

This invention relates to circuit interrupters in general, and more particularly to contact structures and arc-extinguishing units or grid structures therefor.

In United States Patent 2,760,033, issued August 21, 1956, to John B. MacNeill, Fritz E. Florschutz and Carl G. Lentjes there is disclosed and claimed a three-phase, single-tank type of oil circuit interrupter, in which only a single arc-extinguishing unit or grid structure is associated with each of the three pole-units enclosed in the single tank. As stated in this patent, the arc-extinguishing units were of the type disclosed and claimed by Samuel H. Boden and Stanley T. Schofield in their United State Patent 2,039,054 issued April 28, 1939, and assigned to the Westinghouse Electric Corporation.

The single-tank design of the MacNeill et al. patent was directed to a voltage range of 14.4 kv. to 23 kv. with a continuous current rating, in amperes, of 600 to 1200 amperes. The three-phase mva. rating was 100 to 250 mva. and the interrupting time was eight cycles.

The importance and application of such single-tank designs has increased so tremendously in the past few years that it has become desirable to decrease the interrupting time, and correspondingly the pressure and oil-deterioration time within the tank. It is, accordingly, a general object of the present invention to provide an improved and more effective arc-extinguishing unit for the aforesaid type of circuit interrupter, in which the interrupting time may be considerably lowered, so that instead of the interrupting time being eight cycles, it may be reduced to only five cycles by the employment of the improved arc-extinguishing unit of the present invention.

Another object of the present invention is to provide an improved contact structure for a circuit interrupter whereby faster contact separation may be achieved.

A further object of the present invention is to provide an improved butt-type relatively stationary contact structure in which improved relief-valve action may be obtained during high-current interruption to prevent excessive pressure being attained within the substantially enclosed arc-extinguishing unit.

Another object of the present invention is to provide an improved liquid-type arc-extinguishing structure in which liquid pockets, such as oil pockets, are advantageously disposed along the arc passage so that the liquid, such as oil, may be gasified and cause a deionizing flow of gas through the arc stream to effect fast arc interruption.

Another object of the invention is to provide an improvide liquid-type of extinguishing structure defining an elongated arc passage in which a plurality of spaced pressure-generating chambers are disposed along the arc passage, so that the arc is successively drawn through the several pressure-generating chambers.

Another object of the present invention is to provide an improved arc-extinguishing structure in which the magnetic iron plates of the aforesaid Boden et al. patent may be eliminated, and yet, by an improved internal configuration of the arc chamber, the arc interruption time may be reduced from say eight cycles to five cycles or less.

Another object of the present invention is to provide an improved arc-extinguishing unit involving few parts, and in which the assembly time involved, during manufacture, may be reduced.

Another object of the present invention is to provide an improved internal configuration for an arc-interruption chamber, whereby a plurality of spaced orifice openings are provided along an arc passage, and a plurality of pocket-like pressure-generating chambers are interspersed between at least some of said spaced orifice openings. Preferably, the arc passage is side vented at certain advantageous points to effect extremely fast circuit interruption.

Further objects and advantages may readily be perceived upon a reading of the following specifications, taken in conjunction with drawings, in which:

FIGURES 19–22 are detail views of the stationary contact in a disassembled condition;

FIGURE 29 is another modified type of arc-extinguishing unit adapted for interrupting higher current values;

Figure 2:
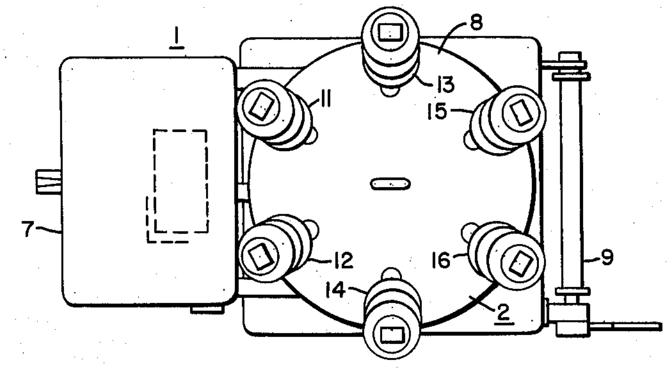
FIGURE 2 is a top plan view of the circuit interrupter of FIGURE 1 indicating the disposition of the three pole units disposed within the single cylindrical tank.
Figure 1:
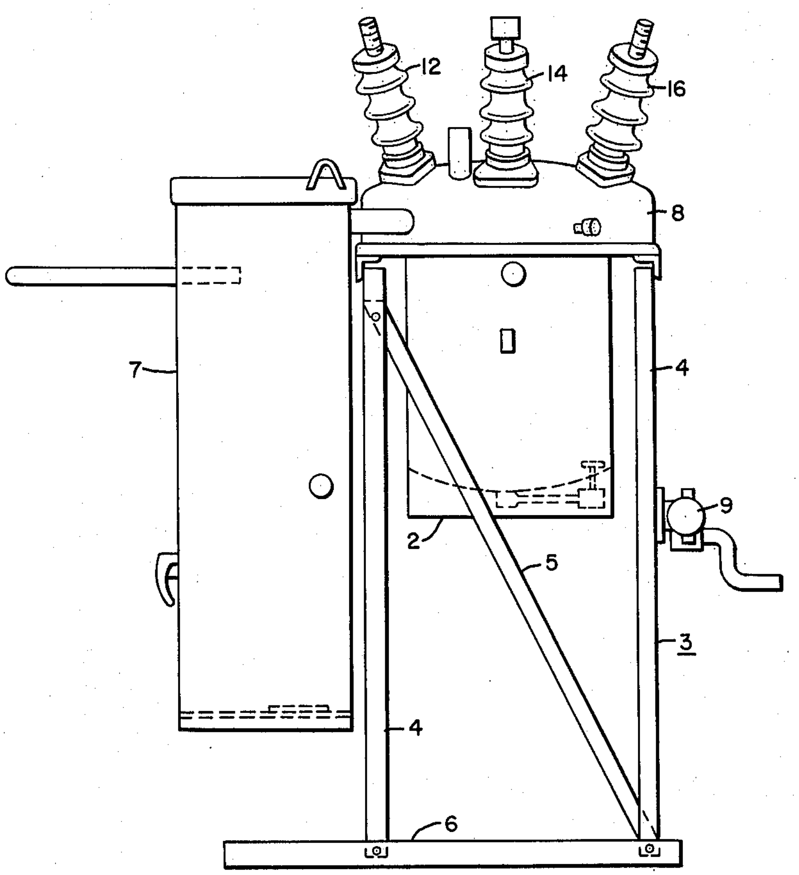
FIGURE 1 is a side elevational view of an outdoor oil circuit interrupter, completely assembled and embodying principles of the present invention.

Referring to the drawings, and more particularly to FIGS. 1 and 2 thereof, the reference numeral 1 generally designates a circuit interrupter including a single tank structure 2 enclosing the three-phase pole-units of the interrupter. As more clearly shown in FIG. 1, an upstanding welded frame support 3 is provided, including vertically extending angle members 4 and diagonally bracing members 5. The lower ends of the angle members 4 are welded to angle-iron skid members 6.

A mechanism housing 7 is fixedly attached to the front of the pressed steel dome housing 8, as shown in FIG. 1. Disposed interiorly within the mechanism housing 7 is a solenoid operating mechanism, not shown, together with control relays and auxiliary wiring to effect opening and closing operations of the circuit interrupter 1. Since the present invention is not concerned with details of the operating mechanism, or with control relays for the circuit interrupter 1, their description is omitted. A windlass-type tank lifter 9 is provided to permit lowering of the single tank 2, together with its oil, and permit exposure of the contact and grid structures for maintenance operations.

Figure 3:
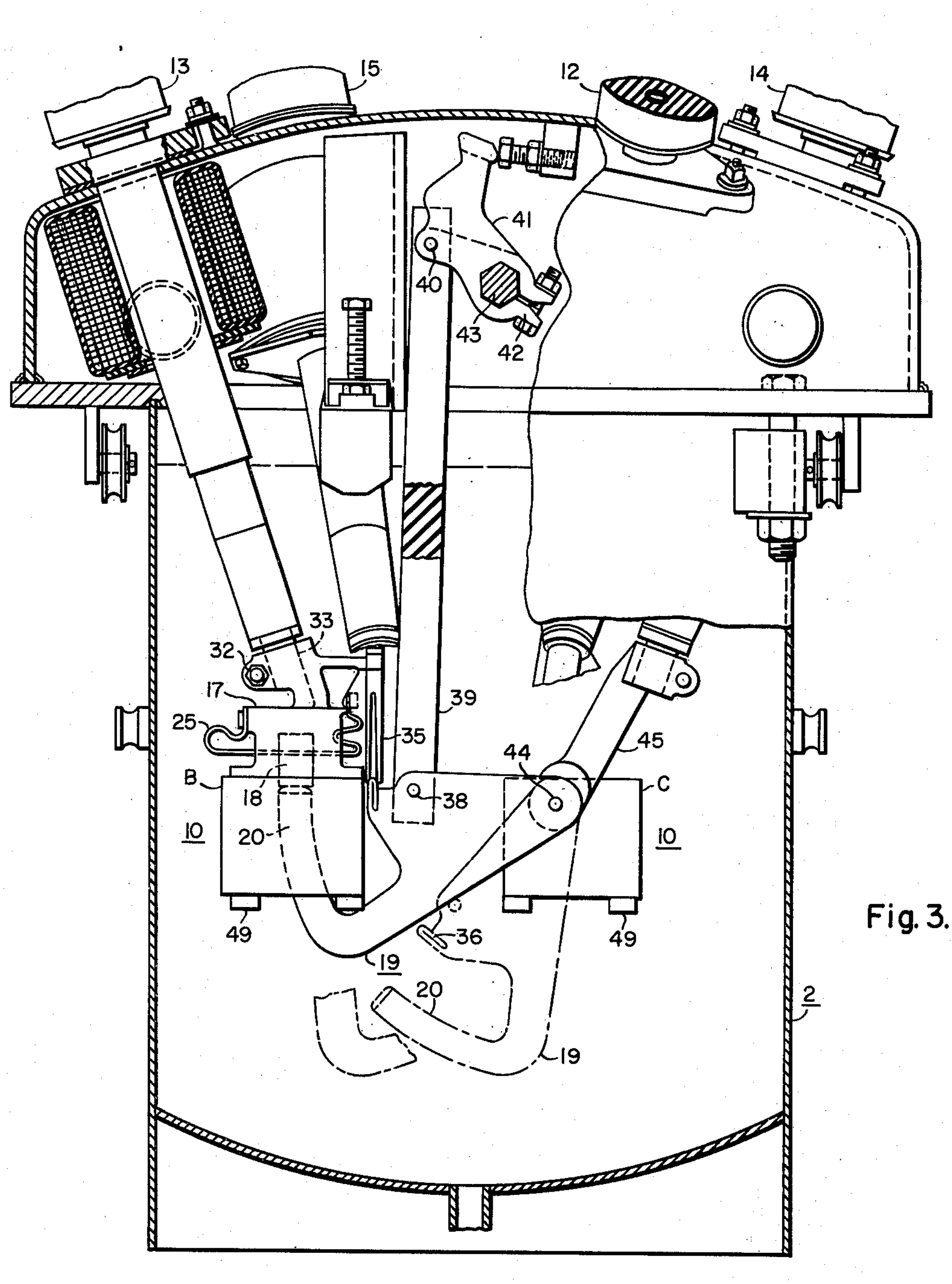
FIGURE 3 is a vertical sectional view taken through the single cylindrical tank and showing, fragmentarily, in full lines, the closed-circuit position of the interrupter.
Figures 4, 4A, 5:
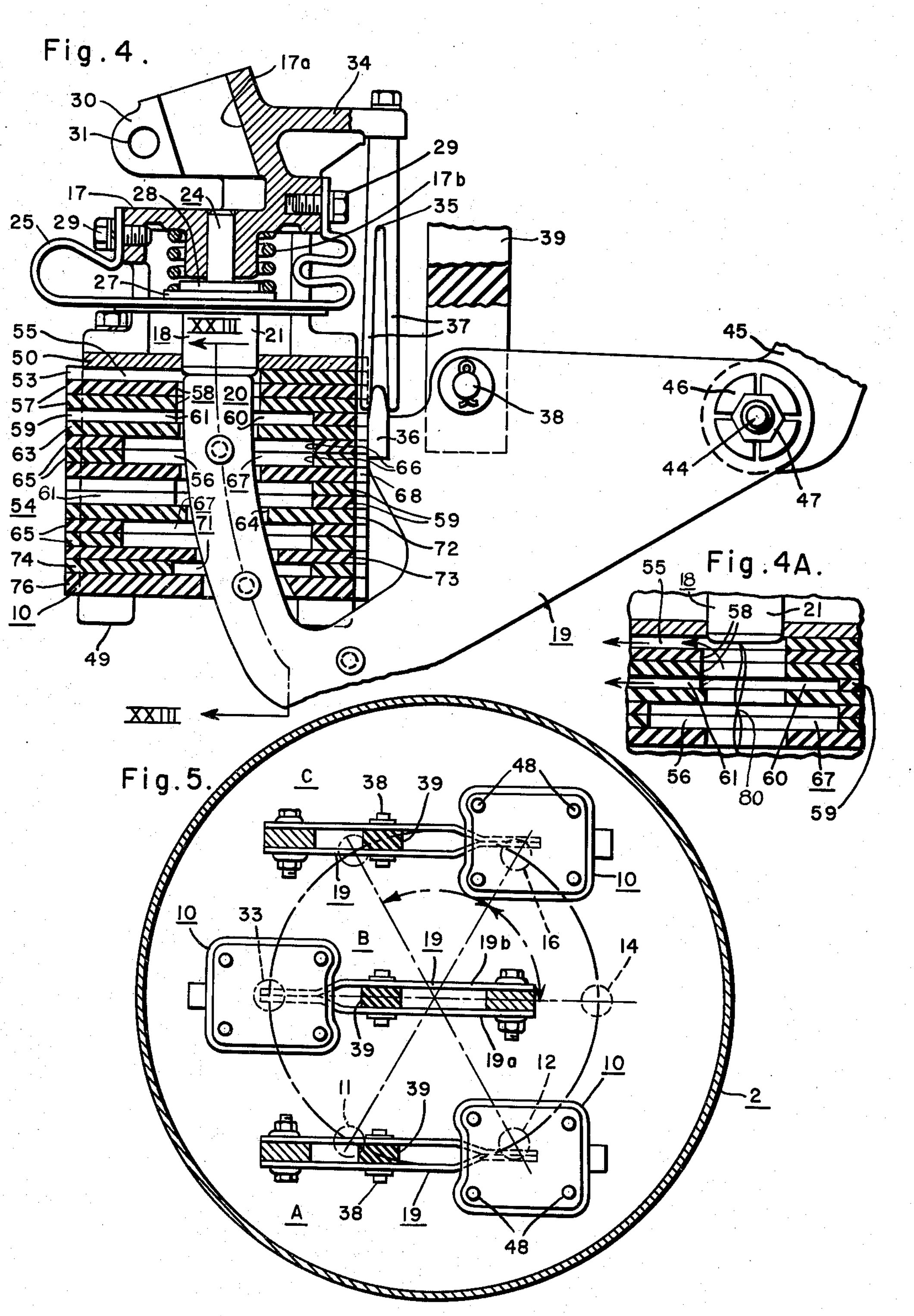
FIGURE 4 is a fragmentary vertical sectional view taken through one of the arc-existing units of FIGURE 3, with the contact structure shown in the closed-circuit position.
FIGURE 4A is a fragmentary detailed view showing backup by the valve-type stationary contact during high-pressure conditions within the grid structure.
FIGURE 5 is a plan view, in section, taken through the enclosing tank, and illustrating the triangular configuration of the arc-extinguishing units for the three pole-units of the interrupter.

With reference to FIG. 3, which more clearly shows the internal disposition of the arc-extinguishing units and the contact structures, it will be noted that an arc-extinguishing unit 10 is associated with each of the three pole-units A, B and C, as shown in FIG. 5 of the drawings. More particularly, a pair of condenser bushings 11 and 12, 13 and 14, and 15 and 16 is associated with each of the three pole-units A, B and C. Considering the middle pole-unit B, with reference to FIG. 5, it will be noted that the arc-extinguishing unit 10 is bolted to a relatively stationary contact housing 17, which supports a relatively stationary contact 18, as shown in FIG. 4. With reference to FIG. 4, it will be noted that cooperating in abutting relation with the relatively stationary contact 18 is a movable hinged contact, generally designated by the reference numeral 19, and having a movable tip portion 20. As shown, the elongated tip portion 20 moves upwardly interiorly within the arc-extinguishing unit 10 during the closing operation.

The construction of the relatively stationary contact 18 is more clearly shown with reference to FIGS. 19–22 of the drawings. A relatively stationary contact tip 21 (FIG. 20) has brazed thereto a stop plate 22. The tip 21 has a tapped hole 23 provided therein to receive a guide stud 24, the latter being more clearly shown in FIGS. 21 and 22. A flexible conducting shunt 25 has a central hole to accommodate the threaded shank portion 26 of guide stud 24. A washer 27 is interposed between a shoulder 28 of stud 24 and the conducting strap 25. The strap 25 has its ends secured by bolts 29 to the contact housing 17. A coiled compression spring **17*b*** provides the desired contact pressure in the closed circuit position shown in FIG. 4.

It will be noted that the upper portion of the contact housing 17 is bifurcated, as at 30, and has an opening 31 provided therein to accommodate a mounting bolt 32, as shown in FIG. 3. In addition, the upper portion of the relatively stationary contact housing 17 forms an adapter portion which is threadedly secured, as at **17*a*, to the lower threaded end of the conductor stud 33, which extends through the terminal bushing 13**. Adjustment may, consequently, readily be made.

Associated with the adapter portion of the contact housing 17 is an off-standing support 34, which supports a downwardly extending splined main contact 35. The main contact 35 cooperates with a movable main contacting portion 36 forming an integral upward extension of the hinged movable contact 19. FIG. 4 illustrates the closed-circuit position of the circuit interrupter 1, in which position the movable main contact portion 36 makes engagement with the main contact 35, slightly spreading the contact fingers 37 apart for contact pressure. Also, as shown, the arcing contacts 18, 20 make abutting engagement. As a result, there are two parallel current paths extending through the circuit interrupter 1.

Pivotally connected to the main hinged contact member 19, as at 38, is an upwardly extending insulating lift rod 39. With reference to FIGURE 3, it will be noted that the upper end of the insulating lift rod 39 is pivotally connected, as at 40, to a crank arm 41, which is clamped, as at 42, to a main hexagonal operating shaft 43. The main hexagonal operating shaft 43 extends through a gas-tight seal into the mechanism housing 7, as illustrated in FIG. 2, and is driven by the previously-mentioned solenoid operating mechanism, disposed within the mechanism housing 7.

Each of the other pole units A and C has a similar construction, except that the arc-extinguishing units 10 are staggered, as illustrated in FIG. 5 of the drawings.

Preferably, for manufacturing simplicity, the hinged main movable contact member 19 is of bifurcated construction, and includes a pair of spaced contact hinges **19*a*, 19*b*, the configuration of which is more readily apparent from an inspection of FIG. 5 of the drawings. The outer ends of the hinged contact members 19*a*, 19*b* are pivotally connected to a hinge pivot 44 provided by a contact hinge foot 45. The hinge bolt 44 cooperates with cup washers 46 and an adjusting nut 47** for the proper contact pressure.

As illustrated in FIG. 5, the other ends of the contact hinge members **19*a*, 19*b* are disposed in contiguous relation, and collectively form the movable contacting tip portion 20 which makes abutting engagement with the relatively stationary contact 18**.

The arc-extinguishing unit 10 will now be described. With reference to FIG. 4 of the drawings, it will be observed that the arc-extinguishing unit 10 is of laminated construction. In other words, the interrupting grid 10 comprises a plurality of suitably-configured horn-fiber insulating plates having suitable internal configurations, and bolted together by four stud bolts 48. The lower head portions of the stud bolts 48 are insulated by insulating cap members 49.

Figure 13:
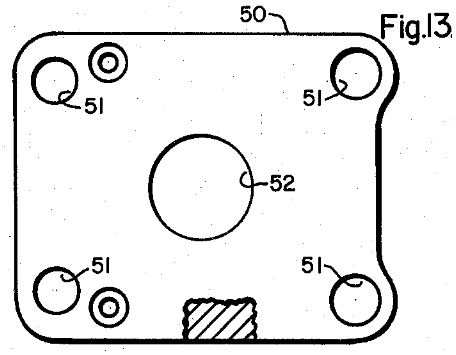
Figure 14:
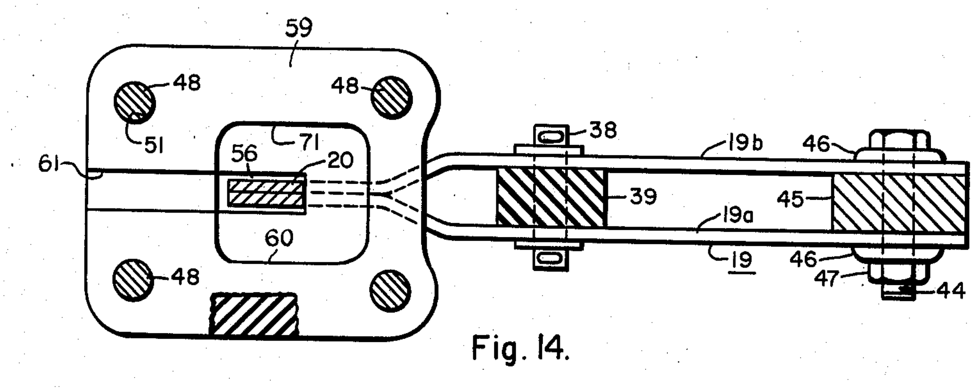
FIGURES 14–17 are sectional views taken along the lines XIV—XIV, XV—XV, XVI—XVI and XVII—XVII respectively of the arc-extinguishing unit of FIG. 23.
Figure 15:
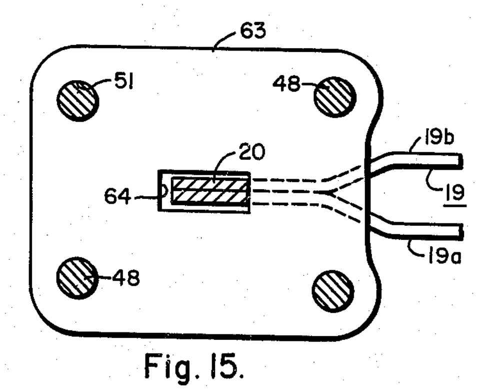
Figure 16:
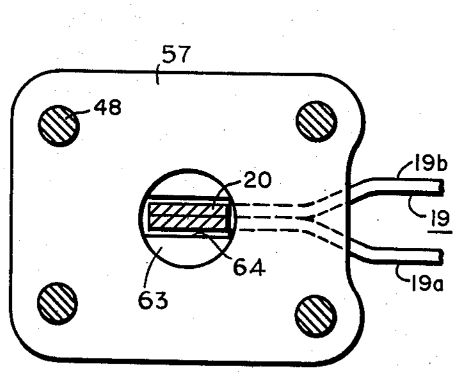
Figure 17:
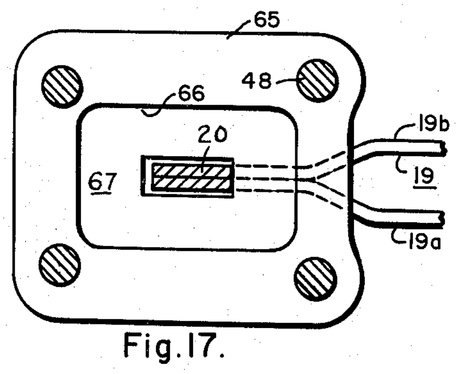

The top plate 50 of the arc-extinguishing unit 10 is preferably a metallic plate, and has a configuration more clearly shown in FIG. 13 of the drawings. It will be observed that the metallic plate 50 has four openings 51 to accommodate the stud bolts 48. In addition, the metallic plate 50 is provided with a centrally-disposed circular aperture 52 to accommodate the shank portion 21 of the relatively stationary contact 18, as indicated in FIG. 4.

Immediately below the metallic top plate 50 is a top venting plate 53, the configuration of which is more clearly illustrated in FIG. 7 of the drawings.

Figure 7:
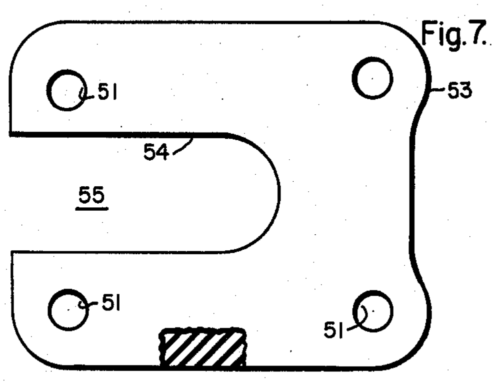

With reference to FIG. 7, it will be observed that again the insulating plate 53 has the four openings 51 to accommodate the mounting studs 48. In addition, the insulating venting plate 53 has a cutout portion 54 providing a vent passage or side relief first opening 55 leading laterally, or transversely out of the arcing passage 56 of unit 10, through which the established arc 80 (FIG. 4A) is drawn.

Figure 6:
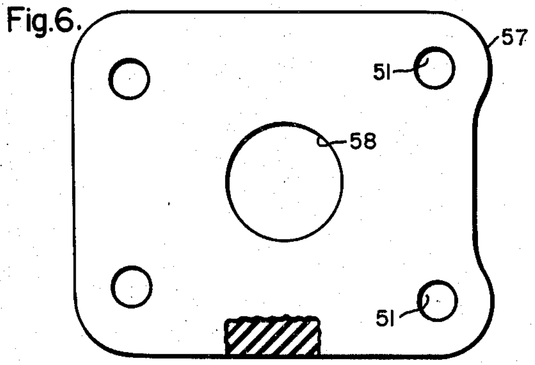
FIGURES 6–13 illustrate plan views of plate details for the particular arc-extinguishing unit of FIG. 4.

Below the top venting plate 53 are disposed two insulating plates 57, the configuration of each of which is more clearly shown in FIG. 6 of the drawings. With reference to FIG. 6, it will be noted that the mounting apertures 51 are again provided. In addition, a centrally disposed opening 58 constituting an orifice is provided to accommodate the shank portion 21 of relatively stationary main contact 18 in its lowered position.

Figure 9:
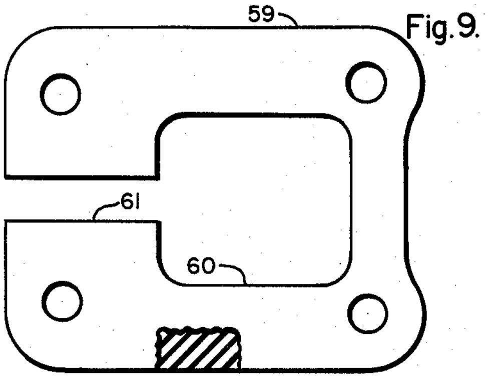
Figure 23:
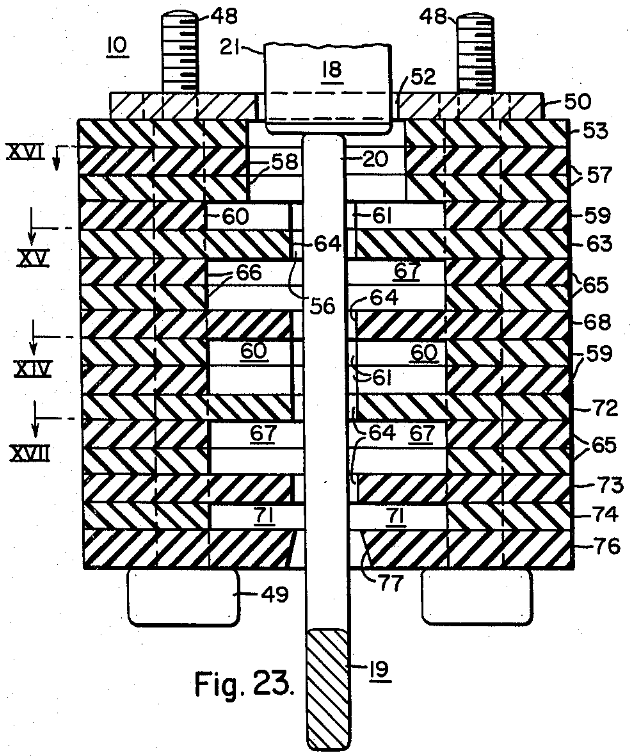
FIGURE 23 is a sectional view taken along the line XXIII—XXIII of the unit of FIG. 4.

The opening 58 in the insulating plate 57 constitutes an orifice portion, through which the established arc is drawn. The gas generated by the heat of the arc within the orifice portions 58 of the two contiguously-disposed plates 57 may be vented through the top venting plate 53, or through a constantly-open lateral second vent passage of a venting plate 59, the configuration of which is more clearly apparent from an inspection of FIG. 9 of the drawings. With reference to FIG. 9, it will be noted that the second venting plate 59 has an enlarged pocket opening 60, which communicates with a constantly-open lateral second venting passage 61. With reference to FIG. 23, it will be noted that the pocket opening 60 is considerably larger than the cross-sectional area of the movable contact 20, and consequently, permits the storage of a considerable quantity of arc-extinguishing fluid, in this particular instance circuit-breaker oil, to be stored along the arcing passage 56. The arc, when drawn along the arcing passage 56 and through the oil pocket 60, will gasify the oil disposed therein, and force the un-ionized oil particles transversely across the arc stream and out the constantly-open lateral second venting passage 61, creating considerable turbulence along the arcing passage 56.

Figure 11:
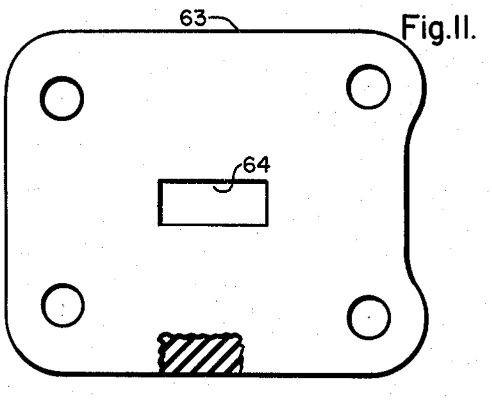

Immediately below the second venting plate 59 is disposed an orifice plate 63, the general configuration of which is more clearly shown in FIG. 11 of the drawings. With reference to FIG. 11, it will be noted that the rectangular orifice 64, which is provided in the plate, is of relatively small dimensions, and allows only slight clearance for the travel of the rectangularly-shaped movable contact portion 20. The purpose for the relatively close dimensions for the orifice opening 64 will become more apparent hereinafter.

Figure 10:
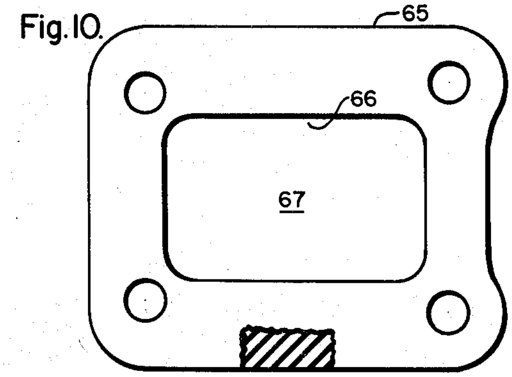

Immediately below the orifice insulating plate 63 is a pair of pressure-generating insulating plates 65, the configuration of which is more understandable from an inspection of FIG. 10 of the drawings. The pocket, or presure-generating insulating plates 65 have provided therein pocket openings 66, constituting a substantially enclosed pressure generating chamber, which permit the accumulation of a considerable quantity of oil situated along the path of travel of the established arc through the arcing passage 56. The gasification of the oil within the oil pocket 67 (FIG. 4) causes pressure to be developed, and the un-ionized liquid particles to be ejected through the restricted orifice opening 64 of the orifice plate 63 (FIG. 11) and through the second venting plate 59 through the constantly-open lateral second vent passage 61 provided therein.

Also, the oil is ejected through a second orifice plate 68, which has a configuration generally similarly to that of the plate 63 of FIG. 11. Because of the rotative travel of the hinged movable contact member 19, the substantially rectangularly-shaped orifice opening 64 of the plate 68 is slightly displaced to the right, as illustrated in FIG. 4, as compared with the aforesaid first rectangularly-shaped orifice insulating plates 63.

Positioned below the orifice plate 68 are a pair of additional venting plates 59, having a configuration as shown in FIG. 9, wherein the venting slot or third lateral vent opening 61 is provided. Because of the provision of relatively enlarged pocket openings 60, a considerable quantity of arc-extinguishing fluid, such as oil, may be trapped within this region 60 (FIG. 23) and blasted transversely across the arc during the gasification of the oil.

Figure 8:
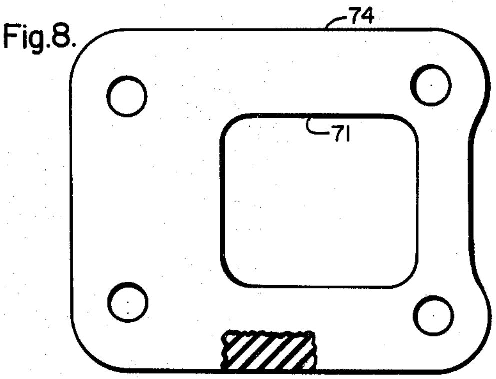
Figure 12:
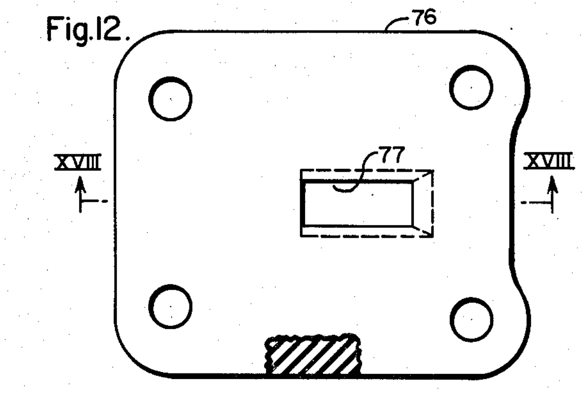
Figure 18:
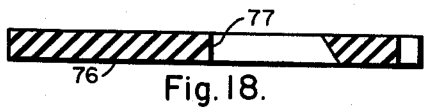
FIGURE 18 is a sectional view taken through the bottom plate of the unit of FIG. 4 substantially along the line XVIII—XVIII of FIG. 12.

Then follows an orifice plate 72 having a configuration generally similar to that of the rectangular orifice plate 63 of FIG. 11, except that the substantially rectangularly-shaped orifice opening 64 of plate 72 is displaced slightly to the right. Then follows two more insulating pocket plates 65 (FIG. 10), a restricted orifice plate 73, the configuration of which is similar to that of the plate 63 of FIG. 11. Then follows an insulating pocket plate 74, the shape of which is set forth in FIG. 8 of the drawings. The pocket plate 74 has an enlarged pocket opening 71, which, as before, stores a plentiful quantity of oil along the path of travel of the established arc. Finally, the bottom insulating plate of the arc-extinguishing unit 10 is designated by the reference numeral 76, and is more clearly shown by FIGS. 12 and 18 of the drawings with a beveled opening 77 therein.

*Opening operation*

During the opening operation the solenoid mechanism disposed within the mechanism housing 7 is unlatched by suitable tripping means, forming no part of the present invention. The release of the latching means for the solenoid mechanism permits the several accelerating springs to effect opening rotative travel of the main operating shaft 43. The counterclockwise rotation of the main operating shaft 43, as viewed in FIG. 3, permits downward opening motion of the three insulating operating rods 39 pivotally connected to the three hinged contact members 19. First, the main contacts 35, 36 separate to force all of the current to flow through the arcing contacts 18, 20, which still are in contacting engagement. Subsequently, the arcing contacts 18, 20 separate to draw an arc 80 (FIG. 4A) therebetween longitudinally along the arcing passage 56, formed by the several openings in the insulating plates. The heat of the arc 80 will gasify the arc-extinguishing fluid, such as oil, within the openings 58 of the plates 57 and will cause the gasified oil to flow out of the venting passages 55, 61. Lengthening of the drawn arc 80 past the first pressure-generating chamber 67 will likewise gasify the oil contained within this substantially enclosed pocket, and will cause it to pass upwardly and downwardly through the restricted orifice openings of the plates 63, 68 into intimate engagement with the arc and then laterally outwardly through the vent openings 61.

As the arc is continued to be lengthened, arc extinction is extremely likely. On circuits of very high rate of recovery voltage, some restriking of the arc may occur and in this eventuality the esablished arc will be lengthened through the enlarged portion 60 of the plates 59 and possibly into the lower pressure generating chamber 67 through the restricted orifice 64 of plate 72.

If the arc 80 is not extinguished by this time, the complete withdrawal of the movable contact portion 20 out of the lower contact opening 77 afforded by the bottom insulating plate 76, will permit the blasting of oil particles and un-ionized gas downwardly through the lower opening 77 to additionally exert arc-extinguishing action upon the established arc. Normally, however, arc extinction occurs within the upper portion of the arc-extinguishing unit 10.

Figure 34:
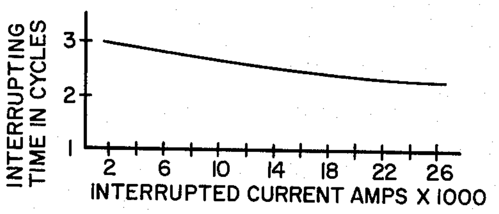

As an indication of the unusual effectiveness of the particular internal configuration of the interrupting grid 10, attention is directed to FIG. 34 of the drawings, which illustrates the low arcing time over a wide range of current values.

FIG. 4A shows the stationary contact 18 functioning as a relief valve during the existence of excessive pressure conditions. This will occur during heavy fault current interruption, and provides additional relief venting out of the top lateral vent opening 55, as indicated by the arrows. In other words, excessive pressure generated during heavy-current interruption causes backup of the relatively stationary contact 18 to thereby uncover said side relief first opening 55 for additional pressure relief and augmented extinguishing action.

Figure 28:
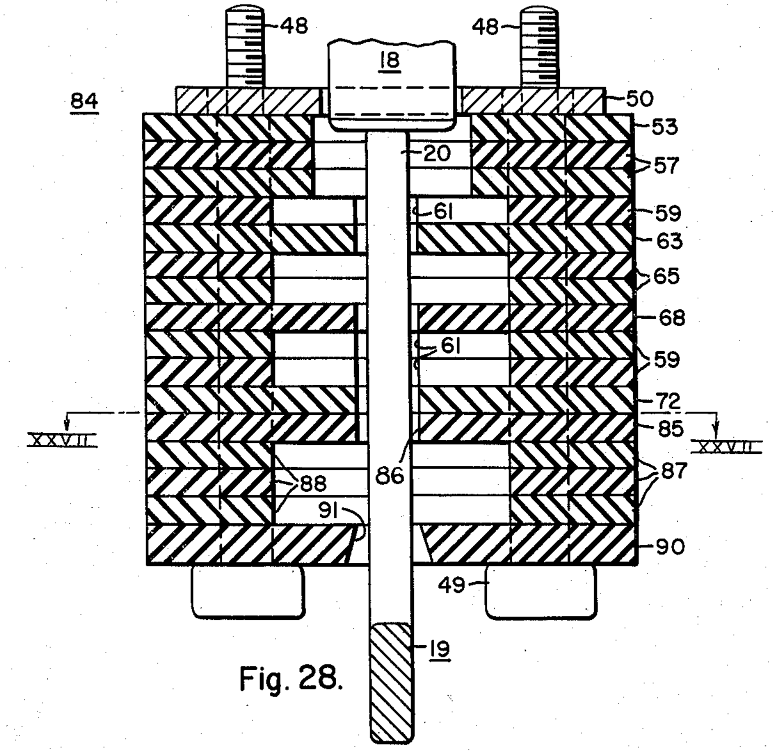
FIGURE 28 is a sectional view taken along the line XXVIII—XXVIII of the unit of FIG. 24.
Figures 24, 25, 26:
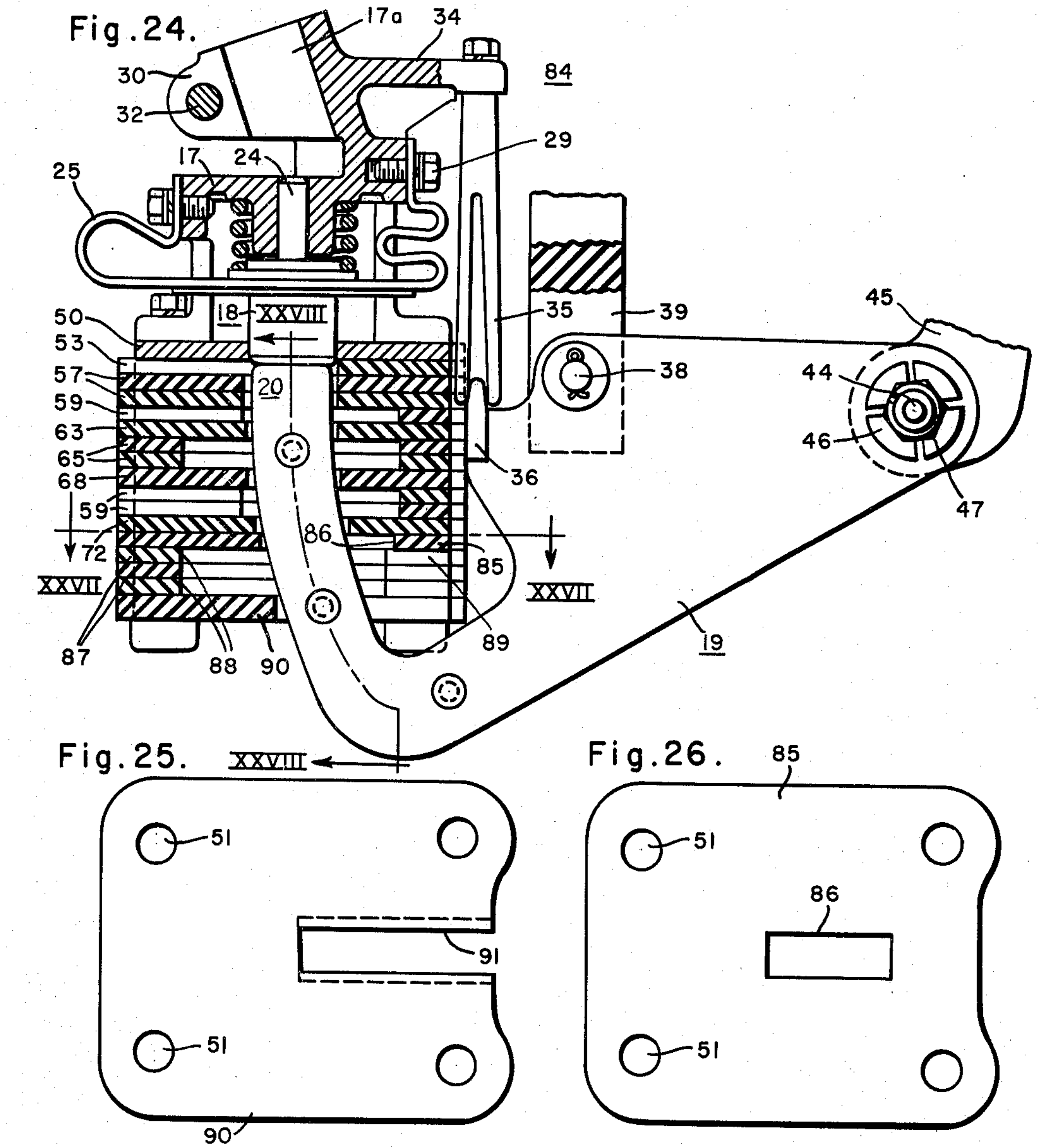
FIGURE 24 illustrates a modified type of arc-extinguishing unit, with the contact structure closed.
FIGURES 25 and 26 are plate details of the unit of FIG. 24.
Figure 27:
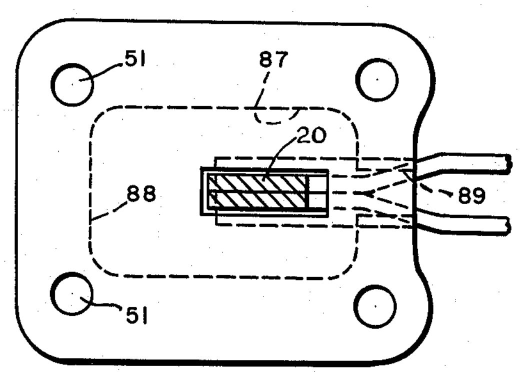
FIGURE 27 is a sectional view taken along the line XXVII—XXVII of FIG. 24.

In the modified type arc-extinguishing unit 84 of FIG. 24, the top twelve plates above the sectional line XXVII—XXVII are identical to the top twelve plates of the unit 10 of FIG. 4 and the functioning of such plates is the same as heretofore described. However, for the effective interruption of low-current arcs, which tend to hang on to the contacts 18, 20 and generate relatively little pressure, the lowermost five plates below the aforesaid sectional line have a different configuration, as shown in FIGS. 25–27 of the drawings. FIG. 28 is a vertical sectional view taken through the modified unit 84 of FIG. 24 for additional clarity of description.

Referring to FIG. 24, below the plate 72 is positioned a plate 85, more clearly shown in FIG. 26 of the drawings. As shown in FIG. 26, an elongated rectangularly-shaped slot 86 is provided in the plate 85 to accommodate opening and closing movement of the rectangularly-shaped movable contact 20. Then follows three insulating plates 87, the configuration of which are clearly shown in the dotted lines of FIG. 27. It will be noted that the plates 87 have an enlarged cutout portion 88 which communicates with a vent opening 89.

The bottom plate 90 of the arc-extinguishing unit 84 has a configuration more clearly shown in FIG. 25 of the drawings. The plate 90 has a slotted opening 91, which leads to the region externally of the unit. For certain applications the unit 84 has particular advantage by providing more venting and expulsive action at the bottom of the grid unit than was present with the unit 10 of FIG. 4.

Figures 30, 31, 32, 33:
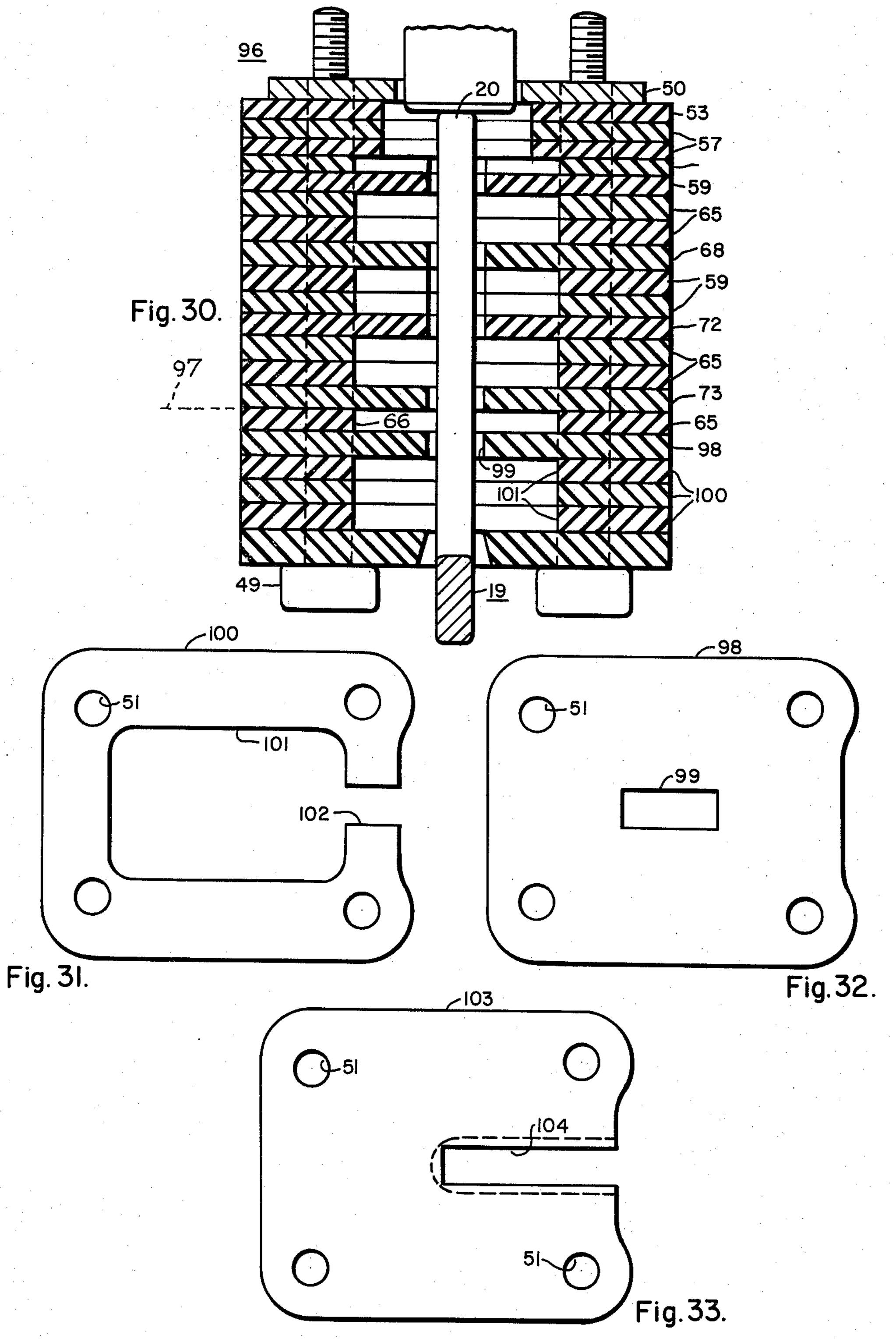
FIGURE 30 is a sectional view taken along the line XXX—XXX of the modified unit of FIG. 29.
FIGURES 31–33 are plate detail views of the plates utilized in the modified unit of FIG. 29; and, FIGURE 34 is a graph indicating the remarkable interrupting performance of the unit of FIG. 4 over a wide current range.

For interrupting higher currents the modified and longer unit 96 of FIG. 29 is preferred. Down to the dotted line 97, the fifteen plates of unit 96 are identical with the top fifteen plates of unit 10, and function in a similar manner. The first plate of unit 96 below the line 97 is a plate 65 (FIG. 10), previously described. Then follows a plate 98 illustrated in FIG. 32 and having a rectangular orfice opening 99 to accommodate thte rectangularly-shaped movable contact 20. Then follows three plates 100, illustrated more clearly in FIG. 31 of the drawings. Each plate 100 has an enlarged cutout opening 101 and a side vent opening 102. The bottom plate of the unit 96 is designated by the reference numeral 103 and is shown more clearly in FIG. 33 of the drawings. The plate 103 has a beveled slot opening 104 to assist in guiding the movable contact 20 into the arc-extinguishing unit 96 from the external disconnecting position of the movable contact 19, as shown in dotted lines in FIG. 3.

The interrupting units 10, 84 and 96 have a load current ratings, for example, of 600 amperes, when the external main contacts 35, 36 are not employed. For carrying higher load currents, for example, 1200 amperes, the external main shunting contacts 35, 36 are utilized. As mentioned, the external main contacts 35, 36 open prior to the separation of the contacts interiorly of the grid structures 10, 84 and 96.

Regarding kva. interrupting ratings of the three grid structures, the arc-extinguishing units 10, 84 are suitable, for example, for an interrupting rating of 100,000 kva. at 14.4 kv. The additional length of the unit 96 renders it more suitable for interrupting the higher powers, such as 250,000 kva. and up to 500,000 kva. at 14.4 kv. These limits are included merely by way of example, and are not to be construed as limitations on the invention, since, as well-known by those skilled in the art, by a suitable proportioning of the parts and including a greater number of pressure-generating chambers the current and voltage ratings may obviously be increased.

From the foregoing description, it will be apparent that there is shown and described an improved arc-extinguishing unit grid construction, in which currents may be carried under load conditions of the order of 600 to 1200 amperes or higher, by a suitable proportioning of the parts. The interrupting time has been reduced to five cycles or less as a result of the improved configuration of the plates, and the necessity of employing iron horse-shoe plates for the grid stack has been eliminated. In addition, venting has been improved, and a more effective directing of the un-ionized fluid particles into the arc stream 80 has been obtained by the particular orifice construction illustrated.

It will be observed that because of the reduction of arcing time, this makes possible a shorter overall fault interrupting time. This also results in less pressure with the arc-extinguishing unit and less disturbance in the breaker tank, thus making possible a higher interrupting rating for a given size breaker. The control of excessive pressure by permitting backup of the relatively stationary contact 18 to uncover the side relief first opening 55 of plate 53 under excessive pressure also assists in eliminating destructive deterioration of the grid units 10, 84 or 96.

Although there have been shown and described particular interrupting structures, it is to be understood that the same were merely for the purpose of illustration, and that changes and modifications my readily be made therein by those skilled in the art without departing from the spirit and scope of the invention.

We claim as our invention:

1. A liquid-type circuit interrupter including a container containing a dielectric liquid therein, an arc-extinguishing unit immersed within said dielectric liquid, means defining an arc passage extending along said unit, a relatively stationary butt contact disposed adjacent one end of said arc passage and substantially blocking said one end thereof, means biasing said stationary contact inwardly along said arc passage, a cooperable movable contact movable longitudinally along said arc passage into and out of abutting engagement with said relatively stationary butt contact to establish arcing along said arc passage, means defining a side relief first opening blocked by said relatively stationary contact when the latter is disposed in its inward open-circuit position, orifice means interposed between said side relief first opening and the remaining portion of the arc passage, means defining a constantly-open lateral second vent passage on the other side of said orifice means from said side relief first opening, means defining a substantially enclosed pressure-generating chamber on the other side of said lateral second vent passage, said substantially enclosed pressure-generating chamber having relatively close-fitting orifice openings through which said movable contact passes and constituting entrance and exit openings to said substantially enclosed pressure-generating chamber, the tip portion of the movable contact separating from the relatively stationary contact to draw an arc longitudinally through the relatively close-fitting orifice openings and through said pressure-generating chamber, means defining a third lateral vent opening on the opposite side of said pressure-generating chamber from said second vent opening, the expulsive side venting action coupled with the longitudinal flow through the close-fitting orifice openings of said chamber causing rapid extinction of the established arc, and excessive pressure generated during heavy-current interruption causing backup of the relatively stationary contact to thereby uncover said side relief first opening for additional pressure relief and augmented extinguishing action.

2. A liquid-type circuit interrupter including a container containing a dielectric liquid therein, a laminated-plate type of arc-extinguishing unit immersed within said dielectric liquid, laminated plate means defining an arc passage extending along said unit, a relatively stationary butt contact disposed adjacent one end of said arc passage and substantially blocking said one end thereof, means biasing said stationary contact inwardly along said arc passage, a cooperable movable contact movable longitudinally along said arc passage into and out of abutting engagement with said relatively stationary butt contact to establish arcing along said arc passage, plate means defining a side relief first opening blocked by said relatively stationary contact when the latter is disposed in its inward open-circuit position, orifice means interposed between said side relief first opening and the remaining portion of the arc passage, plate means defining a constantly-open lateral second vent passage on the other side of said orifice means from side relief first opening, plate means defining a substantially enclosed pressure-generating chamber on the other side of said lateral second vent passage, said substantially enclosed pressure-generating chamber having relatively close-fitting orifice openings through which said movable contact passes and constituting entrance and exit openings to said substantially enclosed pressure-generating chamber, the tip portion of the movable contact separating from the relatively stationary contact to draw an arc longitudinally through the relatively close-fitting orifice openings and through said pressure-generating chamber, plate means defining a third lateral vent opening on the opposite side of said pressure-generating chamber from said second vent opening, the expulsive side venting action coupled with the longitudinal flow through the close-fitting orifice openings of said chamber causing rapid extinction of the established arc, and excessive pressure generated during heavy-current interruption causing backup of the relatively stationary contact to thereby uncover said side relief first opening for additional pressure relief and augmented extinguishing action.

3. A liquid-type circuit interrupter including a container containing a dielectric liquid therein, an arc-extinguishing unit immersed within said dielectric liquid, means defining an arc passage extending along said unit, a relatively stationary butt contact disposed adjacent one end of said arc passage and substantially blocking said one end thereof, means biasing said stationary contact inwardly along said arc passage, a cooperable movable contact movable longitudinally along said arc passage into and out of abutting engagement with said relatively stationary butt contact to establish arcing along said arc passage, means defining a side relief first opening blocked by said relatively stationary contact when the latter is disposed in its inward open-circuit position, orifice means interposed between said side relief first opening and the remaining portion of the arc passage, means defining a constantly-open lateral second vent passage on the other side of said orifice means from side relief first opening, means defining a substantially enclosed pressure-generating chamber on the other side of said lateral second vent passage, said substantially enclosed pressure-generating chamber having relatively close-fitting orifice openings through which said movable contact passes and constituting entrance and exit openings to said substantially enclosed pressure-generating chamber, the tip portion of the movable contact separating from the relatively stationary contact to draw an arc longitudinally through the relatively close-fitting orifice openings and through said pressure-generating chamber, means defining a third lateral vent opening on the opposite side of said pressure-generating chamber from said second vent opening, means defining a second pressure-generating chamber (67) on the other side of said third lateral vent opening toward the other end of said arc passage, the expulsive side venting action coupled with the longitudinal flow through the close-fitting orifice openings of said chamber causing rapid extinction of the established arc, and excessive pressure generated during heavy-current interruption causing backup of the relatively stationary contact to thereby uncover said side relief first opening for additional pressure relief and augmented extinguishing action.

4. A tank-type liquid-break circuit interrupter including a tank filled with an arc-extinguishing liquid, a pair of terminal bushings extending downwardly through the top of the tank, one of said terminal bushings supporting an arc-extinguishing unit immersed within said liquid, the other of the two terminal bushings supporting a hook-shaped rotatable movable contact blade, a cooperable relatively stationary contact disposed at the upper end of said arc-extinguishing unit, means biasing the relatively stationary contact into the arc-exinguishing unit, a side relief opening blocked by the relatively stationary contact when the latter is in its lowered open-circuit position, the arc-extinguishing unit defining a pair of substantially enclosed pressure-generating chambers and an intervening side-vented pressure-generating chamber, means defining relatively tight-fitting orifice openings about the rotatable movable contact blade and constituting entrance and exit openings to the several pressure-generating chambers, the tip portion of the rotatable movable contact blade separating from the relatively stationary contact to draw an arc longitudinally through the relatively tight-fitting orifice openings and through the several pressure-generating chambers, the expulsive side venting action coupled with longitudinal flow through the relatively tight-fitting orifice openings causing rapid extinction of the arc, and excessive pressure causing backup of the relatively stationary contact to uncover said side relief opening for pressure relief.

5. A liquid-type circuit interrupter including a tank containing a dielectric liquid therein, a pair of terminal bushings extending into said tank, an arc-extinguishing unit immersed within said dielectric liquid and supported by the interior end of one terminal bushing, means defining an arc passage extending along said unit, a relatively stationary butt contact disposed adjacent one end of said arc passage and substantially blocking said one end thereof, means biasing said stationary contact inwardly along said arc passage, a cooperable movable contact pivotally supported by the other terminal bushing and movable longitudinally along said arc passage into and out of abutting engagement with said realtively stationary butt contact to establish arcing along said arc passage, means defining a side relief first opening blocked by said relatively stationary contact when the latter is disposed in its inward open-circuit position, orifice means interposed between said side relief first opening and the remaining portion of the arc passage, means defining a constantly-open lateral second vent passage on the other side orifice means from side relief first opening, means defining a substantially enclosed pressure-generating chamber on the other side of said lateral second vent passage, said substantially enclosed pressure-generating chamber having relatively close-fitting orifice openings through which said movable contact passes and constituting entrance and exit openings to said substantially enclosed pressure-generating chamber, the tip portion of the movable contact separating from the relatively stationary contact to draw an arc longitudinally through the relatively close-fitting orifice openings and through said pressure-generating chamber, means defining a third lateral vent opening on the opposite side of said pressure-generating chamber from said second vent opening, the expulsive side venting action coupled with the longitudinal flow through the close-fitting orifice openings of said chamber causing rapid extinction of the established arc, and excessive pressure generated during heavy-current interruption causing backup of the relatively stationary contact to thereby uncover said side relief first opening for additional pressure relief and augmented extinguishing action.

6. A liquid-type circuit interrupter including a container containing a dielectric liquid therein, an arc-extinguishing unit immersed within said dielectric liquid, means defining an arc passage extending along said unit, a relatively stationary butt contact disposed adjacent one end of said arc passage and substantially blocking said one end thereof, said butt contact being secured to a stop plate having a limiting inward position in abutment with one end of said unit, means biasing said stop plate and stationary contact inwardly along said arc passage to said limiting position, a cooperable movable contact movable longitudinally along said arc passage into and out of abutting engagement with said relatively stationary butt contact to establish arcing along said arc passage, means defining a side relief first opening blocked by said relatively stationary contact when the latter is disposed in its inward open-circuit position, orifice means interposed between said side relief first opening and the remaining portion of the arc passage, means defining a constantly-open lateral second vent passage on the other side of said orifice means from side relief first opening, means defining a substantially enclosed pressure-generating chamber on the other side of said lateral second vent passage, said substantially enclosed pressure-generating chamber having relatively close-fitting orifice openings through which said movable contact passes and constituting entrance and exit openings to said substantially enclosed pressure-generating chamber, the tip portion of the movable contact separating from the relatively stationary contact to draw an arc longitudinally through the relatively close-fitting orifice openings and through said pressure-generating chamber, means defining a third lateral vent opening on the opposite side of said pressure-generating chamber from said second vent opening, the expulsive side venting action coupled with the longtiudinal flow through the close-fitting orifice openings of said chamber causing rapid extinction of the established arc, and excessive pressure generated during heavy-current interruption causing backup of the relatively stationary contact and stop plate to thereby uncover said side relief first opening for additional pressure relief and augmented extinguishing action.

7. A liquid-type circuit interrupter including a container containing a dielectric liquid therein, an arc-extinguishing unit immersed within said dielectric liquid, means defining an arc passage extending along said unit, a relatively stationary butt contact disposed adjacent one end of said arc passage and substantially blocking said one end thereof, means biasing said stationary contact inwardly along said arc passage, a cooperable movable contact pivotally mounted about a point on one side of the unit and movable longitudinally along said arc passage into and out of abutting engagement with said relatively stationary butt contact to establish arcing along said arc passage, means defining a side relief first opening venting on the other side of the unit and blocked by said relatively stationary contact when the latter is disposed in its inward open-circuit position, orifice means interposed between said side relief first opening and the remaining portion of the arc passage, means defining a constantly-open lateral second vent passage also venting to the other side of the unit and disposed on the other side of said orifice means from side relief first opening, means defining a substantially enclosed pressure-generating chamber on the other side of said lateral second vent passage, said substantially enclosed pressure-generating chamber having relatively close-fitting orifice openings through which said movable contact passes and constituting entrance and exit openings to said substantially enclosed pressure-generating chamber, the tip portion of the movable contact separating from the relatively stationary contact to draw an arc longitudinally through the relatively close-fitting orifice openings and through said pressure-generating chamber, means defining a third lateral vent opening on the opposite side of said pressure-generating chamber from said second vent opening and venting to the other side of the unit, the expulsive side venting action coupled with the longitudinal flow through the close-fitting orifice openings of said chamber causing rapid extinction of the established arc, and excessive pressure generated during heavy-current interruption causing backup of the relatively stationary contact to thereby uncover said side relief first opening for additional pressure relief and augmented extinguishing action.

8. A liquid-type circuit interrupter including a container containing a dielectric liquid therein, an arc-extinguishing unit immersed within said dielectric liquid, means defining an arc passage extending along said unit, a relatively stationary butt contact disposed adjacent one end of said arc passage and substantially blocking said one end thereof, means biasing said stationary contact inwardly along said arc passage, a cooperable movable contact movable longitudinally along said arc passage into and out of abutting engagement with said relatively stationary butt contact to establish arcing along said arc passage, means defining a side relief first opening blocked by said relatively stationary contact when the latter is disposed in its inward open-circuit position, orifice means interposed between said side relief first opening and the remaining portion of the arc passage, means defining a constantly-open lateral second vent passage on the other side of said orifice means from side relief first opening, means defining a substantially enclosed pressure-generating chamber on the other side of said lateral second vent passage, said substantially enclosed pressure-generating chamber having relatively close-fitting orifice openings through which said movable contact passes and constituting entrance and exit openings to said substantially enclosed pressure-generating chamber, the tip portion of the movable contact separating from the relatively stationary contact to draw an arc longitudinally through the relatively close-fitting orifice openings and through said pressure-generating chamber, means defining a third lateral vent opening on the opposite side of said pressure-generating chamber from said second vent opening, the side relief first opening, the lateral second vent passage and the third lateral vent opening all lying in a single plane extending longitudinally through the unit, the expulsive side venting action coupled with the longitudinal flow through the close-fitting orifice openings of said chamber causing rapid extinction of the established arc, and excessive pressure generated during heavy-current interruption causing backup of the relatively stationary contact to thereby uncover said side relief first opening for additional pressure relief and augmented extinguishing action.

References Cited by the Examiner

UNITED STATES PATENTS

| | | | |
|---|---|---|---|
| 1,998,743 | 4/35 | Thommen | 200—150 |
| 2,036,800 | 4/36 | Ehrenberg et al. | 200—150 |
| 2,039,054 | 4/36 | Boden et al. | 200—150 |
| 2,406,469 | 8/46 | Ludwig et al. | 200—150 |
| 2,547,202 | 4/51 | Friedrich | 200—150 |
| 2,562,160 | 7/51 | Yabuno et al. | 200—150 |
| 2,580,291 | 12/51 | Friedrich et al. | 200—150 |
| 2,760,033 | 8/56 | MacNeill et al. | 200—150 |

KATHLEEN H. CLAFFY, *Primary Examiner.*

MAX L. LEVY, BERNARD A. GILHEANY, *Examiners.*